(12) United States Patent
Nebrig, Jr. et al.

(10) Patent No.: US 7,676,017 B2
(45) Date of Patent: Mar. 9, 2010

(54) VACUUM ACTUATED ANHYDROUS AMMONIA FEED SYSTEM FOR PH ADJUSTMENT OF BOILER CONDENSATE/FEED WATER

(75) Inventors: Herman A. Nebrig, Jr., Hoover, AL (US); Chad E. McKnight, Chelsea, AL (US)

(73) Assignee: Southern Company Services, Inc., Birmingham, AL (US)

( * ) Notice: Subject to any disclaimer, the term of this patent is extended or adjusted under 35 U.S.C. 154(b) by 946 days.

(21) Appl. No.: 11/398,149

(22) Filed: Apr. 5, 2006

(65) Prior Publication Data
US 2007/0237702 A1 Oct. 11, 2007

(51) Int. Cl.
*G21C 19/28* (2006.01)
(52) U.S. Cl. ..................... 376/306; 373/370

(58) Field of Classification Search .......... 210/724, 210/743; 376/306, 370
See application file for complete search history.

(56) References Cited

U.S. PATENT DOCUMENTS

| | | | | |
|---|---|---|---|---|
| 2,194,438 A | * | 3/1940 | Wernlund et al. | 210/724 |
| 3,354,028 A | * | 11/1967 | Illingworth et al. | 162/5 |
| 3,976,541 A | * | 8/1976 | Stiteler et al. | 376/310 |
| 5,308,501 A | * | 5/1994 | Eckert | 210/718 |
| 5,348,662 A | * | 9/1994 | Yen et al. | 210/717 |

FOREIGN PATENT DOCUMENTS

JP 60-183094 * 9/1985

* cited by examiner

*Primary Examiner*—Wayne Langel
(74) *Attorney, Agent, or Firm*—Ryan A. Schneider, Esq.; Troutman Sanders LLP

(57) ABSTRACT

A vacuum actuated and sustained ammonia feed system for the pH adjustment of power plant condensate and boiler feed water is described. This system can provide a safe means of providing anhydrous ammonia for pH adjustment to the condensate/feed water system of a power plant.

8 Claims, 1 Drawing Sheet

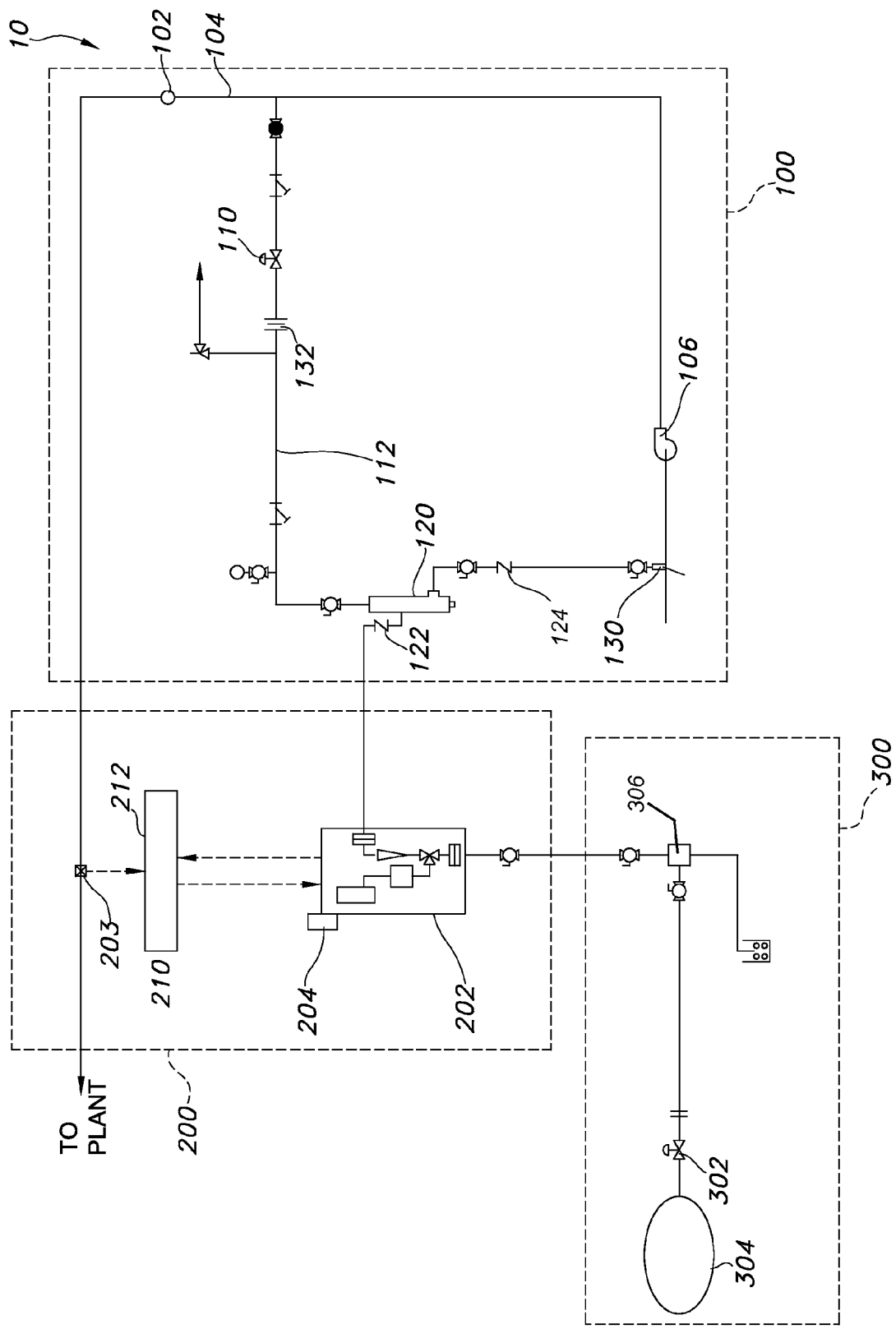

VACUUM ACTUATED ANHYDROUS AMMONIA FEED SYSTEM FOR PH ADJUSTMENT OF BOILER CONDENSATE/FEED WATER

BACKGROUND

1. Field of the Invention

The present invention relates to a method of pH control, and more specifically to a vacuum operated boiler condensate/feed water pH adjustment system using anhydrous ammonia.

2. Description of Related Art

It is known to use ammonia to control the pH of demineralized water in a condensate and feed (condensate/feed) water system of power plants. For example, in one conventional system, aqueous ammonia is fed into the condensate/feed water system via chemical feed pumps to adjust the pH. In another conventional system, anhydrous ammonia is fed into the water flow via mass flow meters from pressurized tanks. Both of these systems will adjust the pH. Thus, while using both aqueous and anhydrous ammonia is known to control pH, neither of these systems can perform the task of controlling the pH in a safe manner, while using a contaminate-free ammonia solution.

There are at least two problems with using aqueous ammonia to adjust the pH of condensate/feed water systems. First, a reagent can become contaminated. In the production of aqueous ammonia, gas is bubbled through water to form the aqueous solution. If the water used in the process is not pure, the contaminates can become a part of the ammonia solution. These contaminates can, and often will, cause problems within power plant systems.

A second problem with using aqueous ammonia to adjust the pH is the low boiling point of aqueous ammonia. For instance, 30% aqueous ammonia will boil at 83 degrees Fahrenheit. The combination of a high ammonia concentration and moderately high environmental temperatures often causes the ammonia within the pump to vaporize, rendering the pump inoperable.

Using a pressurized anhydrous ammonia feed system does not have the same problems as those associated with using aqueous solutions, but can increase the risk of a catastrophic ammonia release due to a pipe or fitting leak. Such a release can have disastrous consequences to plant operating staff as well as nearby populations, as ammonia is a toxic gas.

An example of a conventional power plant water conditioning system includes that shown in U.S. Pat. No. 5,715,290 to Uetake et al., which discloses a reactor water control method in a boiling water reactor (BWR) power plant, wherein the BWR power plant has a low radioactivity concentration reactor water and fuel clad tube for the BWR. Uetake et al. discloses a method of controlling the pH of reactor water in the initial stage of an operation cycle after loading new fuel roads, in a range greater than 7 and less than 9, and, after a predetermined period in the same operation cycle, can reduce the pH of the reactor water below 7. Uetake et al. teaches the use of Be, Zr, Al, Nb, Y and Ti (Beryllium, Zirconium, Aluminum, Niobium, Yttrium, and Titanium) to be fed into the reactor water for pH adjustment.

U.S. Pat. No. 5,230,810 to Clark et al. discloses a corrosion control system for wet oxidation systems. Clark et al. discloses a process for controlling corrosion in a wet oxidation system by controlling the operating pH range within the system. A pH operating range is selected within which corrosion to the wet oxidation system preferably is minimized. The pH within the wet oxidation system is monitored, and a pH adjusting material is added to the waste material being treated to maintain the system pH within the selected pH range, accordingly minimizing corrosion. Clark et al. discloses the generation of wet oxidation by ammonia, amines, or carbon dioxide.

U.S. Pat. No. 4,950,449 to Peterson et al. discloses the inhibition of radioactive cobalt deposition in water-cooled nuclear reactors. Peterson et al. discloses the effective inhibition of radioactive cobalt deposition may be achieved by the continuous addition of zinc oxide to the water entering a water-bearing vessel of the reactor throughout the operation of the reactor. Accordingly, this system can provide steady control of radioactive cobalt accumulation, as well as efficient use of zinc oxide. Thus, Peterson et al. teaches the addition of zinc oxide to the water supply.

U.S. Pat. No. 4,940,564 to Aizawa et al. discloses the suppression of the deposition of radioactive substances in BWRs, particularly in a nuclear power plant. The Aizawa et al. method for suppressing deposition of radioactive substances onto the surfaces of out-of-core components in a boiling water-type, nuclear power plant is characterized by injecting an alkaline element into reactor water in the presence of an amount of the oxygen formed by nuclear fission of the reactor water and dissolved in the reactor water, particularly without hydrogen gas injection, during the nuclear heat up operation period of a boiling water-type nuclear power plant. The reactor water containing the injected alkaline element is circulated through the primary cooling water system of a nuclear reactor, thereby forming an oxide film on the surfaces of out-of-core components in the primary cooling water system of the nuclear power plant.

U.S. Pat. No. 3,612,087 to Roland discloses a water treating device. Roland teaches a device for treating water by controlled injections of bromine. A bromine storage vessel communicates with a dilution vessel-suction pump, which continuously circulates water to be treated therethrough to maintain a negative pressure in the storage vessel. A dosing means communicates with the vessel to intermittently transmit predetermined amounts of brominated water to the dilution vessel.

Therefore, it can be seen that a need yet exists for a pH adjustment system that limits or eliminates vapor locking issues, limits or eliminates contamination of condensate issues, and provides a safe means of pH adjustment to the condensate/feed water system of a power plant. It is to the provision of such a system, preferably, a vacuum actuated and sustained ammonia feed system for the pH adjustment of power plant condensate and boiler feed water, that the present invention is primarily directed.

BRIEF SUMMARY OF INVENTION

Briefly described, in its preferred form, the present invention is a vacuum actuated and sustained ammonia feed system for the pH adjustment of power plant condensate and boiler feed water. The present invention provides a safer means of providing anhydrous ammonia for pH adjustment to the condensate/feed water system of a power plant over conventional methods of either or both feeding aqueous ammonia via chemical feed pumps, and feeding anhydrous ammonia via a mass flow meter and pressurized tanks. The invention comprises a vacuum/carrier water system, an ammonia metering system, and a bulk ammonia storage system.

The present invention uses vacuum assistance to inject anhydrous ammonia into a water stream to adjust the pH. The amount of anhydrous ammonia that can be injected into the water stream is controlled by the ammonia metering system, which meters and monitors the pH of the water stream. The anhydrous ammonia is preferably stored in the bulk storage system located distant from the water stream.

In a preferred embodiment, the water stream is a pressurized water stream of the condensate and boiler feed water system of a power plant. A vacuum is created via the pressurized water stream. As a result, anhydrous ammonia safely can be injected into the water stream. Accordingly, the pH of the water stream changes based on the amount of anhydrous ammonia that is injected. The pH of the water stream is monitored and controlled by the metering system. The ammoniator can control the amount of anhydrous ammonia and, thus, the pH of the water stream. Preferably, anhydrous ammonia is stored in a bulk storage system, which is preferably distant an injection point of a power plant.

Hence, the present invention uses water discharged from a condensate pump of the power plant to provide a pressurized water stream. The pressurized water stream acts as an activation flow for chemical addition, and as a carrier stream to carry diluted ammonia back to the condensate pipe at a site of condensate pump suction.

To activate the ammonia flow, the pressurized water flows through a vacuum-producing eductor, which can draw ammonia gas from a vacuum regulating valve on an anhydrous ammonia bulk storage tank. The amount of ammonia fed into the pressurized water steam can be a function of the conductivity of the condensate stream. Conductivity is used to measure the chemical feed rate, because it provides a linear signal to a system rather than using a direct pH measurement which is, preferably, a logarithmic function.

A signal from the conductivity meter is sent to a programmable controller, which can then determine the amount of ammonia gas that is to be metered into the pressurized water stream by an ammoniator. As the pH in the condensate/feed water system changes, more or less ammonia can be metered into the water stream. If the ammonia gas piping between the vacuum regulator and the eductor were to break or leak, the vacuum would be broken, and subsequently the ammonia flow would stop, preventing a hazardous situation, thereby providing safety to workers at the power plant and the surrounding community.

The present invention includes a vacuum operated anhydrous ammonia feed system appropriately sized to adjust the pH of a power plant's condensate system. For example, the system can be designed to feed from a minimum of 0 pounds per day (ppd), to a maximum of 240 ppd, with, preferably, no gaps in the system's feed capability.

To meet this relatively large feed rate range (i.e., 0-240 ppd), multiple ammoniators, preferably, can be utilized. A manual/auto switch is located in proximity to each ammoniator, enabling either manual or automatic operation. If manual operation is selected, the ammoniator can merely be used in a manual mode. If automatic operation is selected, however, the ammoniator can be controlled from a system process controller. Only one ammoniator should be used at a time, and should be sized to a specific feed rate range—typical ranges including 0 to 10 ppd, 0 to 45 ppd, 0 to 190 ppd, and 0 to 240 ppd.

The ammonia feed rate can be controlled by a 4-20 ma signal from a conductivity instrument located in proximity to the discharge of the condensate pump. The conductivity measurement can be used to provide an indirect indication of the condensate/feed water pH. The signal is sent to the ammoniator control panel, wherein the ammonia feed rate is automatically regulated based on the intensity of the signal.

The ammonia supply for the system can be provided by a storage assembly distant from an ammonia feed shelter. Preferably, an ammonia gas pressure reducing valve is located on the bulk storage assembly. In a preferred embodiment, the pressure of the ammonia gas from the storage tank can be in the range of 20 to 286 psig. The tank pressure should be maintained in the range of 20-220 psig for it to be used as feed to the vacuum regulator valve. Preferably, the vacuum regulator valve allows ammonia gas to pass through the valve when an upstream vacuum is sensed.

The ammonia gas from the feed system can be metered through the ammoniator based on system needs, and can be injected into the vacuum/carrier stream of water at a system eductor. The diluted ammonia stream is then injected back into the condensate pump suction. The condensate pump suction is preferably under a vacuum; therefore, no additional pressure is needed to drive the eductor(s).

A dilution water pressure reducing valve can be provided to reduce the activation/carrier water pressure, and an orifice plate can be installed to meet the flow needs of the ammonia eductor. The hydraulic conditions of the dilution feed water source to a vendor's ammonia feed system can range from, for example, no flow and no pressure to, for example, 3,518 gpm at 343 psig with two condensate pumps operating.

The present invention, thus, allows for the adjustment of condensate pH without the possibility of condensate contamination from impure water used in the manufacturer of the aqueous ammonia, and in a manner that greatly reduces the possibility of a large ammonia gas discharge.

These and other objects, features and advantages of the present invention will become more apparent upon reading the following specification in conjunction with the accompanying drawing FIGURE.

BRIEF DESCRIPTION OF THE DRAWINGS

The sole FIGURE depicts a block diagram of a vacuum actuated and sustained gas feed of anhydrous ammonia to adjust the pH of a condensate/feed water system, in accordance with a preferred embodiment of the present invention.

DETAILED DESCRIPTION OF PREFERRED EMBODIMENTS

Referring now in detail to the drawing FIGURE, wherein like references represent like parts throughout several views, the present invention comprises of a vacuum/carrier water system 100, ammonia metering system 200, and a bulk ammonia storage system 300.

The sole FIGURE depicts a preferred embodiment of the present invention, which is an improved and safe system 10 for adjusting the pH in a boiler condensate/feed water system, typically in a power plant environment. The invention 10 includes a vacuum/carrier water system 100, a metering system 200, and storage system 300.

In a preferred embodiment, the vacuum/carrier water system 100 includes a source 102 of pressurized water 104; a condensate pump 106; a pressure regulating valve 110; a pressurized water feed pipe or conduit 112; an eductor 120; a carrier water pipe 122; an injection point 130; and an orifice plate 132.

The vacuum/carrier water system 100 includes pressurized water 104 from the source 102 and delivered via the feed pipe 112. The present invention can use water discharged from the condensate pump 106 of the power plant to create and provide the pressurized water stream 104. The pressurized water stream 104 can act as an activation flow for chemical addition, and as a carrier stream to carry diluted ammonia back to the condensate pipe 102 at a condensate pump suction.

The carrier water pipe 122, and the eductor 120 are used to create a vacuum to deliver a pH adjustment agent from the storage system 300 to the metering system 200. The pH adjustment agent is metered back into the chemical carrier pipe 124 in the water system 100 for transport to the process injection point 130. In a preferred embodiment, the pH adjustment agent is anhydrous ammonia, the storage system 300 is a bulk ammonia storage tank, and the process injection point 130 is the power plant condensate pump suction pipe.

A pressure regulating valve 110 can control and provide a predetermined amount of pressure to the vacuum producer, or the eductor 120. Additionally, the carrier water pipe 122 can transport the ammonia solution to the injection point 130 at the condensate pump 106 suction.

The metering system 200 can include the ammoniator 202, a control panel 210, and a conductivity analyzer 203. The ammoniator 202 is typically designed to meter gaseous ammonia from a predetermined location. The ammoniator 202 can provide an effective and economic method of feeding ammonia. Wallace & Tiernan, a part of US Filter (a Siemens Company), is an exemplary manufacturer of preferred ammoniators.

The metering system 200 can be designed to feed a range of ammonia, for example, from a minimum of approximately 0 pounds per day to a maximum of approximately 240 pounds per day of anhydrous ammonia. Due to this large feed rate range, multiple ammoniators 202 can be implemented in the metering system 200 to meet the ammonia feed rate needs. A manual and automatic switch 204 is, preferably, located on each ammoniator 202 enabling local manual operation or automatic operation from the system process controller 212 located inside of the control panel 210. If manual operation is selected, the ammoniator 202 can merely be used in a manual mode. If automatic operation is selected, however, the ammoniator 202 can be controlled from a system process controller. Only one ammoniator 202 need be used at a time, and is sized to a specific feed rate range—typical ranges can include: 0 to 10 ppd, 0 to 45 ppd, and 0 to 190 ppd.

The feed rate of the ammonia can be controlled by an approximately 4-20 ma signal from a conductivity analyzer or instrument 203 located in proximity to the discharge of the condensate pump 106. The signal can be sent to the process controller 212 of the ammoniator 202 where the ammonia feed rate can be regulated, preferably, automatically.

After the pH agent, again preferably the anhydrous ammonia, is injected into the pressurized water 104, diluted ammonia is created. This diluted ammonia stream can then be injected into the injection point 130. The condensate pump suction 130 is expected to be under a vacuum; therefore, no additional pressure is needed. A valve 110, preferably a dilution water pressure regulating valve, can decrease the pressure to meet the needs of the ammonia eductor 120. An orifice plate 132 can be located in the pressurized water pipe 112 to regulate water flow to the ammonia eductor 120.

The hydraulic conditions of the dilution feed water to the ammonia feed system can range from no flow and no pressure, to approximately 3,600 gpm at 350 psig, with the condensate pumps 106 operating. Preferably, the hydraulic conditions are approximately 3,518 gpm at 343 psig with at least two condensate pumps 106 running.

The ammonia supply for the system 100 can be provided by a storage assembly 300 distant from an ammonia feed shelter. Preferably, an ammonia gas pressure reducing valve 302 can be located on the bulk storage tank 304. In a preferred embodiment, the pressure of the ammonia gas from the storage tank 304 can be in the range of 20 to 286 psig. The tank pressure should be maintained in the range of 20-220 psig for it to be used as feed to the vacuum regulator valve 306. Preferably, the vacuum regulator valve 306 can allow ammonia gas to pass through the valve 306 when an upstream vacuum is sensed.

The storage assembly 304 houses the anhydrous ammonia, and can be located and/or positioned in proximity to the ammonia metering system 200. The storage assembly 304 can be, for example, a storage tank, a plurality of 150 pound bottles, and the like.

In a preferred embodiment, the storage device 304 is a storage tank located approximately up to 550 feet from a shelter containing the ammonia feed system. An ammonia pressure reducing valve 302 can be located on the storage tank. This valve 302 can regulate the ammonia tank pressure up and/or down to a level necessary to provide ammonia to a vacuum regulator valve 306. The pressure of ammonia gas from the storage assembly 304 to the pressure reducing valve 302 can range from 20 psig to approximately 286 psig.

The vacuum regulator valve 306 can enable ammonia gas to pass when it senses an upstream vacuum.

To activate the flow of the pH adjustment agent, e.g., ammonia, the pressurized water 104 flows through the vacuum-producing eductor 120. The eductor 120 can draw ammonia gas from a vacuum regulating valve on the storage system 300. The amount of ammonia fed into the pressurized water steam 104 can be a function of the conductivity of the condensate stream. Conductivity is used to measure the chemical feed rate because it provides a linear signal to a system rather than using a direct pH measurement which is, preferably, a logarithmic function. A signal from the conductivity meter 203 is sent to a programmable controller 212, which can then determine the amount of ammonia gas that is to be metered into the pressurized water stream 104 by the ammoniator 202. As the pH in the condensate/feed water system 100 changes, more or less ammonia can be metered into the water stream 104. If the ammonia gas piping between the vacuum regulator and the eductor 120 were to break or leak, the vacuum would be broken and the ammonia flow would stop, preventing a hazardous situation, providing safety to workers at the power plant and the surrounding community.

While the invention has been disclosed in its preferred forms, it will be apparent to those skilled in the art that many modifications, additions, and deletions can be made therein without departing from the spirit and scope of the invention and its equivalents as set forth in the following claims.

What is claimed is:

1. A method of adjusting the pH of a stream of water in a water system of a power plant comprising:
   providing a pressurized stream of water in a water system of a power plant; and
   adding anhydrous ammonia into the pressurized stream of water via a vacuum eductor, wherein the pressurized stream of water in the water system of the power plant provides vacuum assistance for the introduction of the anhydrous ammonia.

2. The method according to claim 1, further including controlling the addition of anhydrous ammonia.

3. The method according to claim 2, wherein controlling the addition of anhydrous ammonia comprises controlling the rate of addition of anhydrous ammonia based on conductivity of the pressurized stream of water in the water system of the power plant.

4. The method according to claim 2, further including metering an amount of anhydrous ammonia added into the pressurized stream of water in the water system of the power plant.

5. The method according to claim 4, further including controlling hydraulic conditions of the pressurized stream of water in the water system of the power plant to create the vacuum.

6. The method according to claim 5, further including storing anhydrous ammonia in a storage assembly for addition into the pressurized stream of water in the water system of the power plant, wherein the storage assembly is positioned distant from the addition point.

7. The method according to claim 6, wherein the vacuum created by the flow of the pressurized stream of water through the vacuum eductor is the only assistance for the addition of the anhydrous ammonia from the storage assembly to the point of introduction into the pressurized stream of water in the water system of the power plant.

8. The method according to claim 6, wherein controlling the addition of anhydrous ammonia comprises a control system for use by an operator positioned distant the storage assembly.

* * * * *